(12) United States Patent
Linaker

(10) Patent No.: US 8,467,778 B2
(45) Date of Patent: Jun. 18, 2013

(54) VIDEO CALL DEVICE CONTROL

(75) Inventor: Fredrik Linaker, Antibes (FR)

(73) Assignee: Accenture Global Services Limited, Dublin (IE)

( * ) Notice: Subject to any disclaimer, the term of this patent is extended or adjusted under 35 U.S.C. 154(b) by 906 days.

(21) Appl. No.: 12/528,735

(22) PCT Filed: Feb. 26, 2008

(86) PCT No.: PCT/EP2008/052315
§ 371 (c)(1),
(2), (4) Date: Oct. 8, 2009

(87) PCT Pub. No.: WO2008/104540
PCT Pub. Date: Sep. 4, 2008

(65) Prior Publication Data
US 2010/0103242 A1  Apr. 29, 2010

(30) Foreign Application Priority Data
Feb. 27, 2007 (EP) .................................... 07300828

(51) Int. Cl.
*H04M 3/00* (2006.01)
(52) U.S. Cl.
USPC ........................................................ 455/419
(58) Field of Classification Search
USPC ........................................................ 455/419
See application file for complete search history.

(56) References Cited

U.S. PATENT DOCUMENTS

| | | | |
|---|---|---|---|
| 2001/0021998 A1* | 9/2001 | Margulis | 725/81 |
| 2002/0031567 A1* | 3/2002 | Magario | 425/135 |
| 2005/0206549 A1* | 9/2005 | Stefanik | 341/176 |
| 2006/0182311 A1 | 8/2006 | Lev | |
| 2009/0075634 A1* | 3/2009 | Sinclair et al. | 455/414.1 |
| 2011/0093814 A1* | 4/2011 | Haughawout et al. | 715/810 |

FOREIGN PATENT DOCUMENTS

| | | |
|---|---|---|
| CN | 1731793 A | 2/2006 |
| DE | 10310746 A1 | 12/2004 |
| EP | 1333425 A | 8/2003 |
| JP | 2005-65118 A | 10/2005 |
| JP | 2006-506728 A | 2/2006 |
| JP | 2006-285475 A | 10/2006 |
| WO | 03/027942 A | 4/2003 |
| WO | 2004047011 A2 | 6/2004 |
| WO | 2004047011 A3 | 6/2004 |
| WO | 2004/107099 A2 | 12/2004 |
| WO | 2005/043484 A | 5/2005 |
| WO | 2005/114476 A | 12/2005 |

* cited by examiner

*Primary Examiner* — Alexander Jamal

(57) ABSTRACT

The invention concerns a method of controlling an electronic device (5) using a wireless mobile device (1) having a display (3), and video capturing unit (4), the method comprising successive steps of: establishing a video call between said mobile device and a remote server (6) such that said remote server receives video images captured by said mobile device; performing image recognition to identify an electronic device in said captured video; detecting motion of said video capturing unit; and transmitting a control signal to said electronic device based on the motion of the video capturing unit.

15 Claims, 2 Drawing Sheets

VIDEO CALL DEVICE CONTROL

FIELD OF THE INVENTION

The present invention relates to a system and method for controlling an electronic device, and in particular to a system and method for controlling an electronic device using a wireless handheld device.

BACKGROUND OF THE INVENTION

It has long been a preference of users of electronic devices such as music systems and televisions to control these devices using a wireless remote control. Such remote controls are usually supplied with the device, and generally control the device by transmitting an infra-red signal when the user pushes a particular button on the remote control.

The remote control supplied with electronics devices is typically misplaced by most users on a regular basis, or lost entirely, leaving the electronic device with no means of remote control. Furthermore, if a number of electronic devices are owned by a user, each with its own remote control, the number of different remote controls can become excessive. A solution previously proposed has been to provide a universal remote control that can learn the particular infra-red signals needed for the various electronics devices, enabling them to be controlled, for example even if the original remote control has been lost, or allowing the various devices to be controlled by just one remote control. However, such replacement devices require additional cost, and are complicated in that they need to be programmed. The use of remote controls in general is also difficult, due to the necessity of pushing the correct button for the desired operation, which is usually small and difficult to find.

SUMMARY OF THE INVENTION

It is an aim of the present invention to provide an improved system and method of controlling an electronics device using a wireless handheld device.

According to a first aspect of the present invention, there is provided a method of controlling an electronic device using a wireless mobile device having a display, and video capturing unit, the method comprising successive steps of: establishing a video call between said mobile device and a remote server such that said remote server receives video images captured by said mobile device; performing image recognition to identify an electronic device in said captured video; detecting motion of said video capturing unit; and transmitting a control signal to said electronic device based on the motion of the video capturing unit.

According to one embodiment of the present invention, before said step of sending a control signal, the method further comprises establishing a connection between the remote server and the electronic device.

According to another embodiment of the present invention, the method further comprising, before said motion detection step, transmitting to said mobile device information indicating the commands of said device corresponding to motions of said video capturing unit.

According to a further embodiment of the present invention, performing image recognition comprises accessing an object database comprising a plurality of object images and/or signatures and matching features of said video images with said object images and/or signatures.

According to a further embodiment of the present invention, said control signal is transmitted via the Internet.

According to a further embodiment of the present invention, said motion comprises rotation of the video capturing unit.

According to a further aspect of the present invention, there is provided a method of using of a wireless mobile device for controlling an electronic device, wherein said mobile device comprises a video capturing unit, the use comprising: using said mobile device to establish a video call between the mobile device and a remote server; pointing said video capturing unit at the electronic device; and moving the video capturing unit such that the electronic device moves in the field of view of the video capturing unit to control, based on the movement, the electronic device.

According to yet a further aspect of the present invention, there is provided a system for controlling an electronic device, comprising: a wireless mobile device comprising a video capturing unit arranged to capture video images; and a server capable of communicating with said mobile device in a video call and of receiving said video images, said server comprising: an image recognition unit arranged to identify an electronic device in one or more of said video images; a motion detection unit arranged to detect motion of the video capturing unit; and a control unit arranged to transmit a control signal to said electronic device based on said motion of video capturing unit.

According to one embodiment of the present invention, the system further comprises an object database accessible by said server, said object database containing images and/or signatures used for identifying said electronic device.

According to a further embodiment of the present invention, the system further comprises a wireless communication network allowing communication between said wireless mobile device and said server.

According to a further embodiment of the present invention, the server is connected to said wireless communications network by the internet.

According to a further embodiment of the present invention, the server is connected to said wireless communications network by a switched network.

According to a further aspect of the present invention, there is provided an automatic control unit arranged to control an electronic device comprising: a video calling unit arranged to communicate with a wireless mobile device in a video call and to receive video images captured by said mobile device; an image recognition unit arranged to identify an electronic device in one or more of said video images; a motion detection unit arranged to detect a motion of said electronic device in said video images; and a control transmission unit arranged to generate and transmit a control signal to said electronic device based on motion detected by the motion detection unit.

According to a further embodiment of the present invention, the control transmission unit is arranged to transmit said control signal to said electronic device via the internet.

According to a further embodiment of the present invention, the motion detection unit is arranged to detect clockwise or counter-clockwise rotation of said video capturing unit.

DETAILED DESCRIPTION OF THE EMBODIMENTS OF THE PRESENT INVENTION

Figure 1:
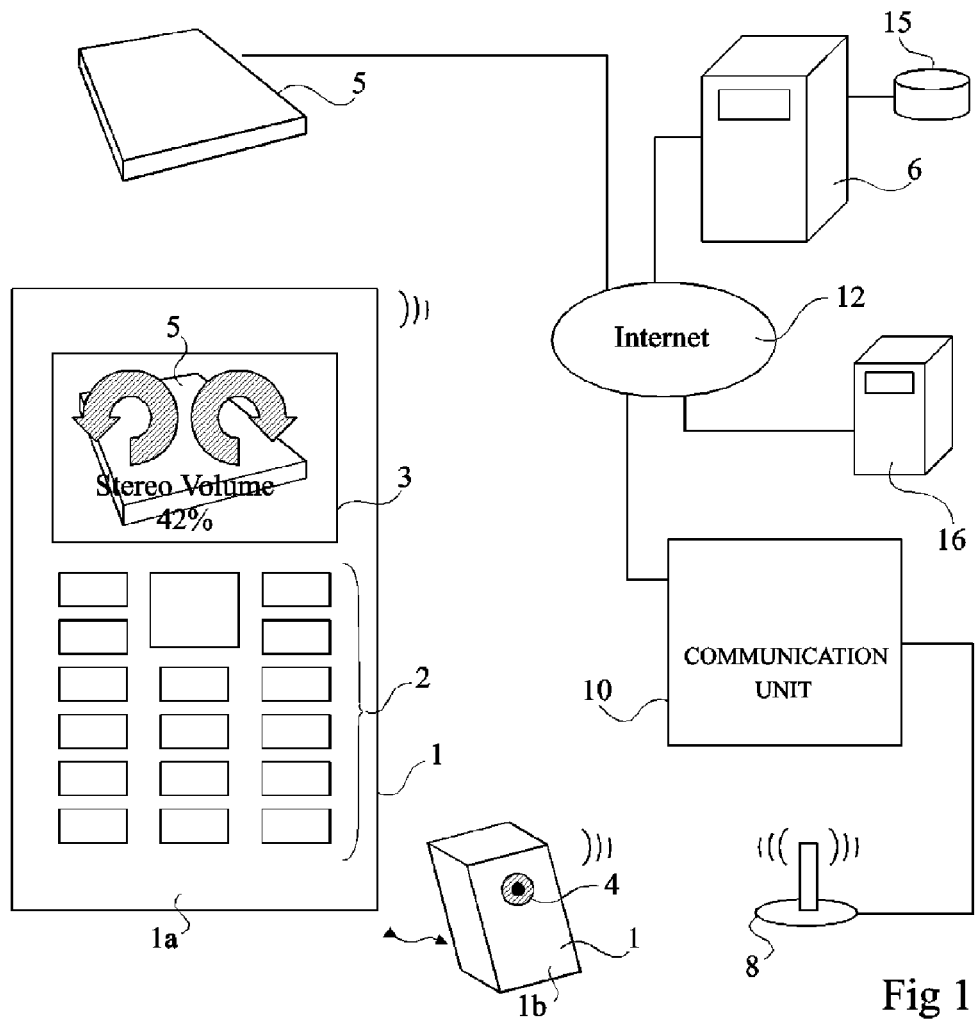
FIG. 1 schematically illustrates a control system for an electronic device according to a first embodiment of the present invention.

FIG. 1 illustrates a system for controlling an electronic device. The system comprises a mobile device 1, which is a wireless mobile device having video call capabilities. For example, mobile device 1 is a 3G (third generation) standard mobile telephone, allowing video calls to be established with third parties. Alternatively, mobile device 1 could be a PDA (personal digital organiser), laptop, portable games console or the like, that can capture video, and wirelessly transmit and preferably also receive video streams. Both the front side 1a and the rear side 1b of the mobile device are illustrated.

Mobile device 1 comprises, on front side 1a, a key pad 2, allowing data to be entered or the device to be controlled, and a display 3, which is for example an LCD (liquid crystal display). Mobile device 1 also comprises, shown in this example on the rear side 1b, a camera 4 allowing digital video images to be captured. Modern mobile telephones are generally equipped with such cameras 4, mounted somewhere on the device, and allowing a user to capture video, usually at the same time as viewing the video being captured on a display. Mobile device 1 preferably also comprises a microphone (not shown) for capturing sound, which can be transmitted in a signal with the captured video.

According to this embodiment, it is desired to use mobile device 1 to control an electronics device 5. In the present example device 5 is a music system, however a wide variety of devices could be controlled, including televisions, heating/air conditioning systems, personal computers etc.

In a first step, a user starts by initiating a video call, and points the camera of mobile unit 1 at the electronics device 5. Device 5 is thus recorded using the video capabilities of the mobile device 1. The device includes a distinctive exterior surface, identifying for example the make and model of the device.

The video call is established with a remote image recognition server 6. For example, the user has been provided with a particular dial-up number for use in establishing a video call with server 6. Alternatively, the establishment of such a video call could be performed automatically by the mobile device 1, initiated for example by user selection of a particular icon on the display 3, or a voice command by the user, the necessary connection parameters being pre-programmed in the mobile device 1. The image recognition server is for example a PC, laptop, or other processor.

A video call is used throughout the present application to mean a call in which video images are transmitted at least one way. Generally in the present examples video is for example at least transmitted from the mobile device to the object recognition server 6 during the video call. Additionally, video images, still images and/or voice signals may be transmitted back to the mobile device, either within the video call, or separately.

The mobile device 1 for example establishes the call via a mobile communications network, comprising a number of transmitting and receiving masts 8, connected to a communication unit 10. For example, the mobile communication network could be a UMTS (universal mobile telephony system) network such as a UTRAN system (UMTS terrestrial radio access network) according to the 3G standard. Alternatively, the room or office with the electronic device in which the user is currently located could have an internal WLAN (wireless local area network), which the mobile device 1 could have access to. In such a case, mast 8 would be a WLAN antenna, and the communication unit 10 a WLAN server. As a further example, the mobile device 1 may have WiFi (wireless fidelity) capabilities, mast 8 and communication unit in this case being a WiFi antenna and a server or PC, respectively.

The communications hardware 10 is coupled to the image recognition server 6. As shown in FIG. 1, in some embodiments the communication unit 10 is connected to image recognition server 6 via the Internet 12. However, in alternative embodiments, the communication unit 10 is connected directly to the image recognition server 6, for example in the case that the information access system of FIG. 1 is provided entirely within the room/office in which the user is now present. Alternatively, communication unit 10 could be connected to image recognition server 6 by an ISDN (Integrated Services Digital Network). Some mobile telephone service providers allow a video call to be routed to a particular line in an ISDN network.

Image recognition server 6 receives the video stream from mobile device 1, and performs image recognition on the image. Image recognition techniques are known in the art and generally comprise real-time visual recognition software that determines the identity of objects in one of a series of images. The real-time visual recognition software of the image recognition server 6 receives and decodes the video call data, identifies any known objects in view, in this case the image of device 5, and preferably calculates the position of the object relative to the camera of the mobile device 1.

For example, methods for performing this type of image recognition are discussed in more detail in the publication "Robust Object Recognition with Cortex-Like Mechanisms" (IEEE Transactions on Pattern Analysis and Machine Intelligence, Vol. 29, No. 3, March 2007, by T. Serre, L. Wolf, S. Bileschi, M. Riesenhuber, and T. Poggio), which is hereby incorporated by reference to the extent allowable by the law.

The object is for example identified based on the design of the device, for example colours of particular portions, brand names marked on the exterior, etc. Part of or the entire exterior surface of the device 5 is for example known from an object database 15. Object database 15 is coupled to the image recognition server 6, and contains visual signatures of objects. One or more signatures and images may be stored for each object. Signatures are unique patterns that are present in an image of the device that uniquely identify the device. If the objects have a principle surface, for example the front of a music system or television, then the object database 15 for example stores only signatures or images of this surface. However, some electronic devices may be distinctive from a number of different sides, and in this case, images of each of the sides of the object could also be stored in database 15. The object database 15 may be internal or external to the server 6.

In some embodiments, object signatures could be stored locally in the object database 15, and further visual data relating to the objects could be retrieved from the Internet 12. The Internet provides an enormous source of images, in particular images of electronics devices. Thus, via the Internet 12, a remote database 16 could be accessed, which contains images of devices, and these images could for example be used to confirm an image match, or update the object database with images of new devices.

Once the image recognition server 6 has identified the make/model of the electronic device, it also determines an address of that particular device, for example in the form of a network address, internet and/or IP address, or Uniform Resource Identifier (URI) and opens a connection to that device, for example via the internet. For example, in some embodiments, the image recognition server 6 recognizes the caller's mobile number when the video call is requested/established. The image recognition server also stores a list associated with each user of the electronic devices that the user is authorized to control, along with an electronic address of each device. Thus once the device has been identified from among the devices associated with that user, the connection via the internet can be established, allowing command signals to be transmitted to the device. Alternatively, electronic devices can be uniquely identified by the image recognition server. In some cases there may be more than one electronic device of a particular make and model that users could have access to. In such cases a user may make their device visually unique, for example by adding a label or the like.

More and more electronic devices are designed with network and/or internet access, or with the capability of being connected to a computer having internet access, and are thus controllable via that computer. Furthermore, in some embodiments, the device is accessible over a network other than the internet, for example via a wireless network such as a WLAN, etc. For example, such connections allow remote control, allow software updates to be installed and/or provide access to other media, such as films or music files available online.

Figure 2:
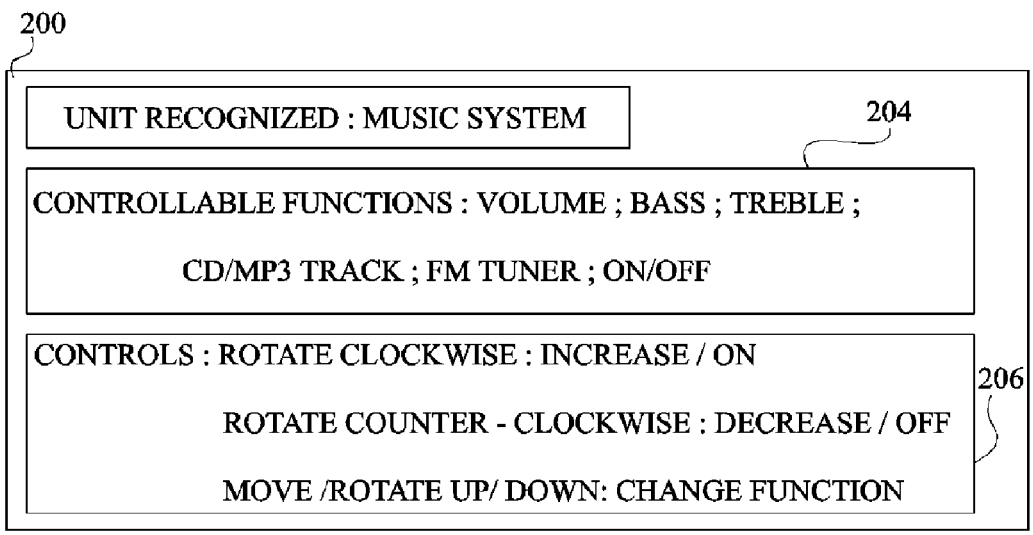
FIG. 2 illustrates a data record according to one embodiment of the present invention.

Associated with each object image in database 15 a record is for example stored that indicates the possible ways of controlling the identified electronic device. Such a record is either pre-stored in the object database, or received from the electronic device 5 once a connection with the device has been established. The record includes the command set for the device, preferably in a form such that it can be transmitted to the mobile device 1 and presented to the user on display 3. FIG. 2 illustrates an example of such a record.

As shown in FIG. 2, record 200 comprises a first field 202 indicating the identity of the device, in this case a music system. Another field, 204, lists the controllable functions of the electronic device. The examples provided in FIG. 2 are for the music system, and include volume, bass, treble, CD/MP3 track, FM tuner frequency and ON/OFF. A further field 206 indicates what effects different movements of the mobile device 1 have. In this example, rotating the mobile device clockwise has the effect of increasing the selected function, or in the case of a digitally controlled function, such as ON/OFF, switching it on, while rotating the mobile device counter-clockwise has the effect of decreasing the function, or in the case of a digitally controlled function, such as ON/OFF, switching it off. Moving or tilting the mobile device upwards or downwards changes the selected function, and for example does this by scrolling through the possible functions.

Image recognition server 6 responds to the mobile device 1 by transmitting a signal, which can be a video stream or any signal compatible with a video call, providing the user with details of the various commands that are available. For example, the response could be in the form of a voice message transmitted in the video call, indicating the different functions of the electronic device that can be controlled. In alternative embodiments, the signal comprises one or more still images, or video with or without sound. For example, the signal could comprise the video stream received from the mobile device 1, with a message superimposed on the screen confirming the identified device, for example using the text of field 202: "Unit recognized: Music system". Then the currently selected function and the movements that are possible to control this function can be shown. The default function is for example the first function in the list of functions of field 204, in this case the volume. An example of this screen is shown on display 3 of the mobile device 1 in FIG. 1.

Figure 3:
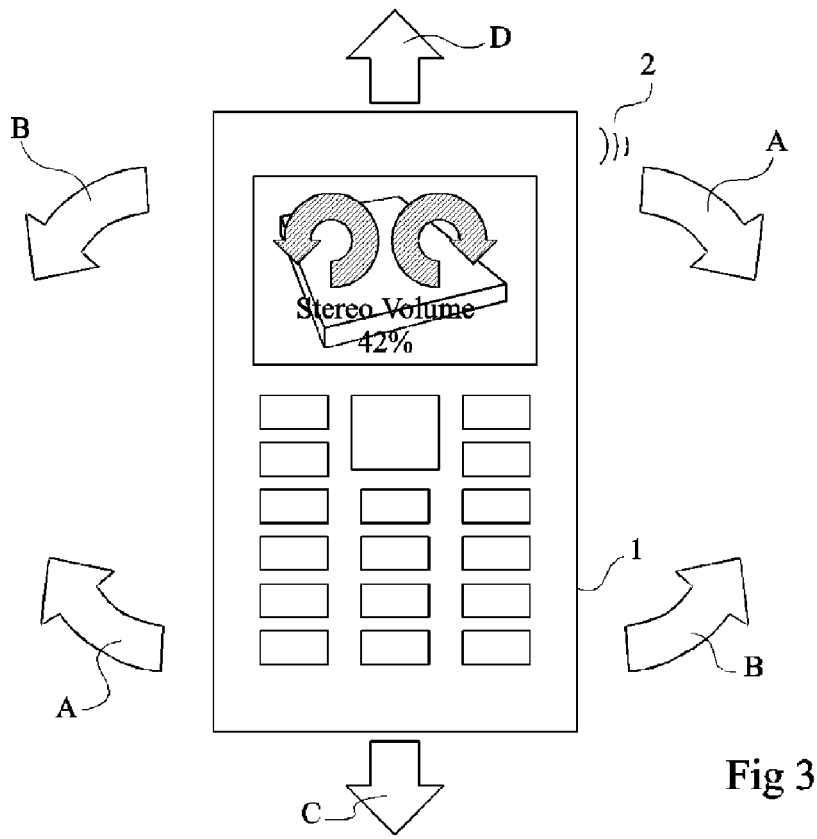
FIG. 3 illustrates examples of motions of a hand held portable device according to the present invention.

FIG. 3 illustrates the mobile device 1, and shows examples of the possible movements that can be performed to control electronic device 5. In particular, moving or turning the mobile device 1 clockwise or counter-clockwise, as indicated by arrows A and B respectively, causes an optical flow in the recognized object or image captured by the camera of the mobile device counter-clockwise or clockwise respectively. For example, a rotation of the mobile device clockwise in the direction of arrow A, will result in a counter-clockwise rotation of all images of the objects shown on the display 3.

The movement of the object or image can be detected by the image recognition server 6. Techniques for detecting the movement of a camera from a series of video images are known in the art. For example, the publication titled "Real-time Simultaneous Localization and Mapping with a Single Camera" (Proceedings on the $9^{th}$ International Conference on Computer Vision, Nice, 2003, A. J. Davison), which is hereby incorporated by reference to the extent allowable by the law, describes such a technique. Furthermore, paper titled "Camera Phone Based Motion Sensing: Interactive techniques, Applications and Performance Study" (In ACM UIST 2006, Montreux, Switzerland, October 2006, J. Wang, S. Zhai and J. Canny), which is hereby incorporated to the extent allowable by the law, also describes such techniques.

After detecting the movement of the object or image, the image recognition server 6 responds by transmitting corresponding commands to the electronic device. For example, in the present case, if volume is selected, and the mobile device is rotated clockwise (the object in the captured images having a rotation counter-clockwise), a command is sent to the music system to increase the volume. If a motion of the image up or down is detected, the functions are for example scrolled through.

Figure 4:
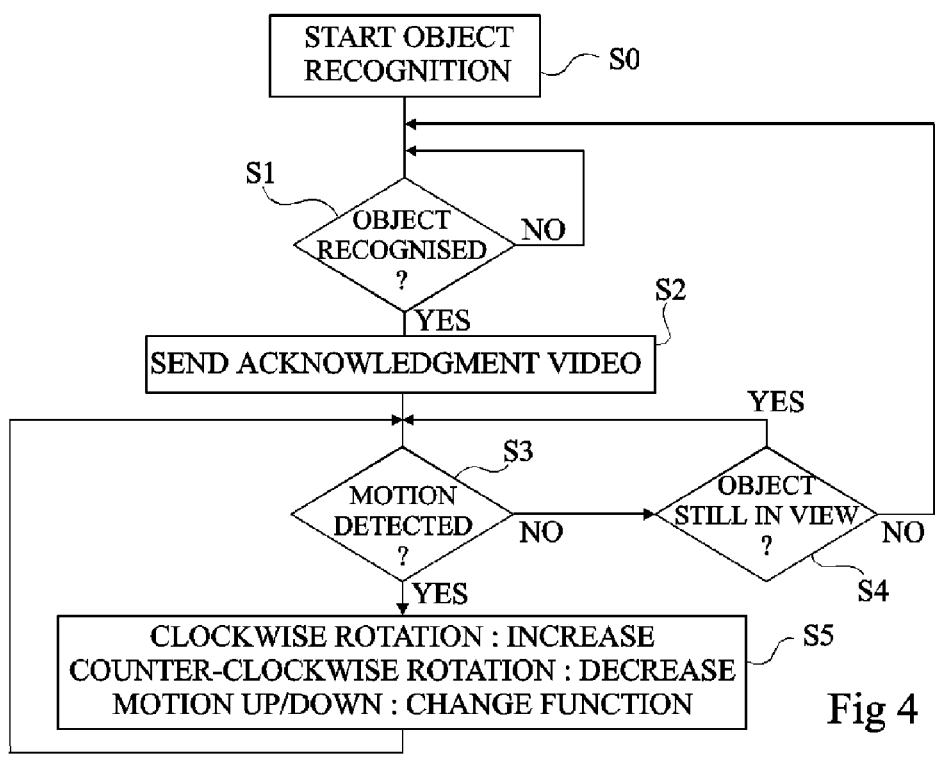
FIG. 4 is a flowchart illustrating successive steps in the method for controlling an electronic device according to the present invention.

FIG. 4 is a flow diagram illustrating steps performed by the image recognition server 6.

In a first step S0, image recognition is started, which can for example be triggered by the reception by image recognition server 6 of a request to start a video call, and reception of a video stream originating from a registered mobile device 1. The image recognition server preferably identifies the particular mobile device 1 making the call by the calling phone number, and configures itself according to the user's authorization level and preference settings such as language settings, alert triggers and logging options. When image recognition begins, the image recognition server may for example transmit a video stream to mobile device 1 having the text "scanning for device" superimposed over the video image received from the mobile device 1, or could transmit a more personalized message.

In a next step S1, the image recognition server 6 determines whether a device within the video stream has been identified. Firstly, it extracts image feature points from the image in real-time and identifies known objects in the image by matching extracted feature points against object features in the object database 15. If no object matching a device has been identified, then step S1 is repeated. There is for example a small delay after each test for image recognition, such that until an object is identified, image recognition is repeated at intervals of for example 100 ms, for example corresponding to the time delay between successive frames in the video stream. If an object and corresponding electronic device is identified, this device becomes the active device, and the next step is S2.

In some cases, there may be more than one recognized electronic device within the video images. In this case, the method proceeds for example on the basis that the device closest to the center of the video images is the object the user wishes to control. This device then becomes the active device.

In step S2, a connection is opened to the electronic device that has been identified. Also, the image recognition server 6 transmits a return video stream in which the electronic device identification is provided, for example superimposed over the image of device, and options are provided on the display for commanding the device. As explained above, this information may be obtained from the object database 15, or from the electronic device, accessed for example via the Internet.

In a next step S3, it is determined whether image motion is detected. This is performed by calculating the optical flow of feature points with respect to previous incoming images. These motions can then be matched against motion templates to detect whether motion is clockwise, counter-clockwise, up or down.

If no image motion is detected, the next step is S4. In step S4, it is detected whether the electronic device is still in view. If the device is no longer in view, this may indicate that the user no longer wishes to control the active device, or that the active device was not the device that the user wished to control. In this case, the next step is S1, in which the image recognition server searches for another electronic device. However, if the electronic device is still in view, the next step is to repeat S3.

If motion is detected in step S3, the next step is S5. In step S5, depending on the motion of the image in the video capture area, different commands are transmitted to the electronic device. Once such commands have been generated and transmitted, the next step is S3, in which further motion of the image is detected to determine whether further commands are needed.

In some embodiments, a command could be repeatedly sent to the electronic device after a rotation is detected, until rotation in the counter sense is detected. This is particularly relevant to analogue type functions such as volume. For example, if in step S3 a clockwise rotation is detected, the next step is to send a command to increase the volume and then to repeat S3. However, the command to increase the volume will for example only cease to be transmitted when in step S3 a counter-clockwise rotation is detected, or when the mobile device is held stationary for a short period, or based on a voice command such as "execute" or "finished".

In some alternative embodiments, once an electronic device 5 has been identified, it can remain under the control of motions of the mobile device 1, even when the electronic device 5 no longer appears within the field of view of the camera of the mobile device. Command of this same electronics device 5 then continues until a further event is recognized by the remote server 6, such as a voice command by the user, a special motion of the mobile device, or until another electronic device 5 has been detected in the images captured by the camera 4. In the latter case, the other electronic device would become the controlled device.

The image recognition process can be stopped at any time by the user by ending the video call.

Thus, a method and system has been described in which a user can command an electronics device captured by a mobile device having video calling capabilities, control being achieved by movements of the mobile device. Rather than performing image recognition in the mobile device itself, a video link is maintained with a server with performs recognition, provides real-time content, and keeps a record of all interactive sessions.

Advantageously, a user can control an electronic device quickly and easily, using a device such as a 3G mobile phone. Thus when a remote control unit is for example misplaced, a standard mobile device having video call capabilities, which may already be owned by the user, can be used to control the device.

The method of commanding the device during the video call is advantageously touch-less, in other words the user need not touch keys on the mobile device, but only move the device. Furthermore, the entire process of starting the call, commanding the device, and ending the call is preferably also completely or nearly completely touch-less, the video call for example being established and ended by voice command.

By providing an image recognition server able to detect motion of the mobile device, command of the electronics device is easily achieved by motions of the whole mobile device, rather than by pushing buttons. This could be of particular utility to those with a disability such as arthritis who might find operating a keypad difficult.

While a number of specific embodiments of the present invention have been described above with reference to the figures, it will be apparent to those skilled in the art that there are numerous modifications and alterations that can be applied.

For example, whilst particular applications of the invention have been described, there are alternative applications of the invention that are possible, such as controlling a mobile robot or vehicle, controlling a pan-tilt-zoom camera in a looking-glass manner, controlling a robotic arm that conducts music or prepares food remotely, controlling an avatar (a graphical image representing a person) or as an input device in a video game.

While certain types of motions have been described for controlling the information received from the image recognition server, different motions could be recognized, for example forward or back motions of the device, left or right motions or motions in diagonal directs, for example up and to the left.

The invention claimed is:

1. A method of controlling an electronic device using a wireless mobile device having a display, and video capturing unit, the method comprising successive steps of:
    establishing a video call between said mobile device and a remote server such that said remote server receives video images captured by said mobile device;
    performing image recognition to identify an electronic device in said captured video;
    detecting motion of said video capturing unit; and
    transmitting a control signal to said electronic device based on the motion of the video capturing unit.

2. The method of any preceding claim, further comprising, before said step of sending a control signal, establishing a connection between the remote server and the electronic device.

3. The method of claim 1, comprising, before said motion detection step, transmitting to said mobile device information indicating the commands of said device corresponding to motions of said video capturing unit.

4. The method of claim 1, wherein performing image recognition comprises accessing an object database comprising a plurality of object images and/or signatures and matching features of said video images with said object images and/or signatures.

5. The method of claim 1, wherein said control signal is transmitted via the Internet.

6. The method of claim 1, wherein said motion comprises rotation of the video capturing unit.

7. A method of using a wireless mobile device for controlling an electronic device, wherein said mobile device comprises a video capturing unit, the method comprising:
- using said mobile device to establish a video call between the mobile device and a remote server;
- pointing said video capturing unit at the electronic device; and
- moving the video capturing unit such that the electronic device moves in the field of view of the video capturing unit to control, based on the movement, the electronic device.

8. A system for controlling an electronic device, comprising:
- a wireless mobile device comprising a video capturing unit arranged to capture video images; and
- a server capable of communicating with said mobile device in a video call and of receiving said video images, said server comprising:
- an image recognition unit arranged to identify an electronic device in one or more of said video images;
- a motion detection unit arranged to detect motion of the video capturing unit; and
- a control unit arranged to transmit a control signal to said electronic device based on said motion of video capturing unit.

9. The system of claim 8, further comprising an object database accessible by said server, said object database containing images and/or signatures used for identifying said electronic device.

10. The system of claim 8 or 9, further comprising a wireless communication network allowing communication between said wireless mobile device and said server.

11. The system of claim 10, wherein said server is connected to said wireless communications network by the internet.

12. The system of claim 10, wherein said server is connected to said wireless communications network by a switched network.

13. An automatic control unit arranged to control an electronic device comprising:
- a communication unit arranged to communicate with a wireless mobile device in a video call and to receive video images captured by said mobile device;
- an image recognition unit arranged to identify an electronic device in one or more of said video images;
- a motion detection unit arranged to detect a motion of said wireless mobile device by analyzing said video images; and
- a control transmission unit arranged to generate and transmit a control signal to said electronic device based on motion detected by the motion detection unit.

14. The automatic control unit of claim 13, wherein said control transmission unit is arranged to transmit said control signal to said electronic device via the internet.

15. The automatic control unit of claim 13 or 14, wherein motion detection unit is arranged to detect clockwise or counter-clockwise rotation of said video capturing unit.

* * * * *